United States Patent
Disson et al.

(10) Patent No.: US 8,859,678 B2
(45) Date of Patent: Oct. 14, 2014

(54) THERMOPLASTIC COMPOSITION COMPRISING A THERMOPLASTIC MATRIX AND A TERPOLYMER OF ALKYL METHACRYLATE, ALKYL ACRYLATE AND A STYRENE MONOMER

(75) Inventors: Jean-Pierre Disson, Vernaison (FR); Rosangela Pirri, Montardon (FR)

(73) Assignee: Arkema France, Colombes (FR)

( * ) Notice: Subject to any disclaimer, the term of this patent is extended or adjusted under 35 U.S.C. 154(b) by 38 days.

(21) Appl. No.: 12/526,809

(22) PCT Filed: Feb. 12, 2008

(86) PCT No.: PCT/FR2008/050219
§ 371 (c)(1),
(2), (4) Date: Nov. 25, 2009

(87) PCT Pub. No.: WO2008/104701
PCT Pub. Date: Sep. 4, 2008

(65) Prior Publication Data
US 2010/0075088 A1 Mar. 25, 2010

(30) Foreign Application Priority Data
Feb. 12, 2007 (FR) ..................... 07 53187

(51) Int. Cl.
| | |
|---|---|
| *C08L 33/12* | (2006.01) |
| *C08G 63/00* | (2006.01) |
| *C08L 25/14* | (2006.01) |
| *C08L 27/06* | (2006.01) |
| *C08L 69/00* | (2006.01) |
| *C08L 55/02* | (2006.01) |
| *C08L 67/02* | (2006.01) |

(52) U.S. Cl.
CPC ............. *C08L 69/00* (2013.01); *C08L 27/06* (2013.01); *C08L 55/02* (2013.01); *C08L 69/005* (2013.01); *C08L 67/02* (2013.01); *C08L 33/12* (2013.01)
USPC ............. 525/55; 525/154; 525/165; 525/222; 525/233; 525/238; 525/239; 525/241

(58) Field of Classification Search
USPC ............. 525/50, 55, 154, 165, 191, 222, 231, 525/233, 238, 239, 241
See application file for complete search history.

(56) References Cited

U.S. PATENT DOCUMENTS

| | | | |
|---|---|---|---|
| 4,408,015 | A | 10/1983 | Flatau |
| 4,692,295 | A | 9/1987 | Vinatier |
| 6,723,762 | B1 | 4/2004 | Sunagawa et al. |
| 2004/0171741 | A1* | 9/2004 | Sato et al. ............ 524/568 |
| 2007/0066708 | A1* | 3/2007 | Goldacker et al. ........ 523/160 |
| 2007/0197728 | A1 | 8/2007 | Sato et al. |

FOREIGN PATENT DOCUMENTS

| | | |
|---|---|---|
| JP | 2002167457 | 6/2002 |
| WO | WO 03006546 A1 * | 1/2003 |
| WO | WO-2005052038 A1 * | 6/2005 |

OTHER PUBLICATIONS

Eaves, David. Handbook of Polymer Foams Rapra Technology Limited, Shawbury et al (2004) pp. 123-125.*

* cited by examiner

*Primary Examiner* — Irina S Zemel
*Assistant Examiner* — Jeffrey Lenihan
(74) *Attorney, Agent, or Firm* — Lynn B. Morreale

(57) ABSTRACT

The invention relates to a thermoplastic composition comprising at least one thermoplastic matrix; and at least one copolymer obtained by copolymerization of $C_1$-$C_4$ alkyl methacrylate, a $C_1$-$C_8$ alkyl acrylate comonomer, and a styrene monomer. The invention also relates to molded bodies based on said thermoplastic composition.

15 Claims, No Drawings

THERMOPLASTIC COMPOSITION COMPRISING A THERMOPLASTIC MATRIX AND A TERPOLYMER OF ALKYL METHACRYLATE, ALKYL ACRYLATE AND A STYRENE MONOMER

This application claims benefit, under U.S.C. §119 or §365 of FR 0753187 filed Feb. 12, 2007; and PCT application PCT/FR2008/050219 filed Feb. 12, 2008.

The invention relates to a thermoplastic composition comprising a thermoplastic matrix and a specific processing aid, having especially excellent mechanical properties, in particular its properties being isotropic.

The invention also relates to a process for producing an article from said composition and to an article obtained from this composition.

Processing aids are agents designed to give a thermoplastic matrix into which they are incorporated improved mechanical strength properties of the composition in the melt state (especially in terms of elongation at break, elasticity and tensile strength).

In general, processing aids are copolymers obtained by copolymerizing methyl methacrylate with one or more acrylate and/or methacrylate monomers, said copolymers having a molecular weight that may be equal to several million. The acrylate monomers are generally $C_1$-$C_8$ alkyl acrylate monomers, while the methacrylate monomers are generally $C_1$-$C_8$ alkyl methacrylates.

However, these processing aids are made up of copolymer chains having an inhomogeneous composition. In particular, for processing aids obtained by batch copolymerization of methyl methacrylate and n-butyl acrylate, the methyl methacrylate and n-butyl acrylate have very different reactivity ratios, having the effect that methyl methacrylate is incorporated more rapidly than n-butyl acrylate.

This specifically results in copolymer chains of low n-butyl acrylate concentration at the start of copolymerization and of higher n-butyl acrylate concentration at the end of copolymerization. The mixture of copolymer chains obtained at the end of copolymerization is thus very inhomogeneous.

Once they have been incorporated into a thermoplastic matrix, these copolymers give the resulting composition a heterogeneity and make the properties of this composition anisotropic. This heterogeneity is manifested in particular by an irregular surface appearance, for example after extrusion.

Furthermore, PVC foams and in particular rigid foams, are at the present time often unsatisfactory in terms of surface appearance, density and mechanical properties.

The inventors were set the objective of providing a thermoplastic composition comprising a thermoplastic matrix and a copolymer having a processing aid function, which composition has a homogeneous appearance even when the polymerization is carried out batchwise, and consequently uniform mechanical properties.

Thus, the inventors have surprisingly discovered that by incorporating a particular monomer within a specific range into the copolymer acting as processing aid, it was possible to overcome the drawbacks of the prior art.

Thus, the invention relates, according to a first subject, to a thermoplastic composition comprising:
  at least one thermoplastic matrix; and
  at least one copolymer obtained by copolymerizing a $C_1$-$C_4$ alkyl methacrylate with a $C_1$-$C_8$ alkyl acrylate comonomer and a styrene monomer,
the $C_1$-$C_4$ alkyl methacrylate being present in an amount ranging from 75% to 92% by weight relative to the total weight of the monomers, the $C_1$-$C_8$ alkyl acrylate comonomer being present in an amount ranging from 5 to 25% by weight relative to the total weight of the monomers and the styrene monomer being present in an amount ranging from 3 to 20% by weight relative to the total weight of the monomers.

Advantageously, the copolymer is obtained by batch copolymerization of a $C_1$-$C_4$ alkyl methacrylate, preferably methyl methacrylate, with a $C_1$-$C_8$ acrylate comonomer and a styrene monomer.

The expression "total weight of the monomers" is understood to mean the sum of the introduced weights of $C_1$-$C_4$ alkyl methacrylate, $C_1$-$C_8$ alkyl acrylate comonomer and styrene monomer.

Introducing the styrene monomer within the aforementioned range, thus changing the reactivity ratio of the three monomers, contributes to the acrylate monomer being introduced more easily into the copolymer chains.

Introducing a styrene monomer within the range specified above gives the resulting polymer a chain composition homogeneity that does not exist in the case of copolymers not having said styrene monomer.

The expression "chain composition homogeneity" is understood to mean chains all having substantially the same acrylate/methacrylate/styrene comonomer ratios. This chain composition homogeneity may be determined by any method known per se, for example by LAC (liquid adsorption chromatography).

Chain homogeneity makes it possible, after incorporation into the thermoplastic resin, to obtain a thermoplastic composition having improved rheological properties, and thus improved mechanical properties, whether in terms of elongation at break, elasticity or tensile strength.

Moreover, introducing the styrene monomer does not degrade the mechanical properties of the composition, nor the compatibility of the copolymer with the thermoplastic matrix. It is important for the styrene monomer not to have a content greater than 20%, so as to prevent loss of compatibility with the matrix.

According to the present invention, the copolymer results from copolymerizating a $C_1$-$C_4$ alkyl methacrylate with a $C_1$-$C_8$ alkyl acrylate comonomer and a styrene monomer, said $C_1$-$C_4$ alkyl methacrylate and said styrene monomer being present in specific amounts.

Advantageously, the $C_1$-$C_4$ alkyl methacrylate is present in an amount ranging from 75 to 92%, preferably 80 to 87%, by weight relative to the total weight of monomers. Preferably, the $C_1$-$C_4$ alkyl methacrylate is methyl methacrylate.

The $C_1$-$C_8$ alkyl acrylate comonomer may be chosen from ethyl acrylate, n-butyl acrylate, and 2-ethylhexyl acrylate, and is preferably n-butyl acrylate.

The $C_1$-$C_8$ alkyl acrylate comonomer is advantageously present in an amount ranging from 5% to 25% by weight, preferably 10% to 20% by weight, relative to the total weight of the monomers.

According to the invention, the styrene monomer may be chosen from styrene, ethylstyrene and α-methylstyrene.

The styrene monomer is generally present in an amount ranging from 3 to 20%, advantageously 4 to 12%, by weight relative to the total weight of the monomers.

One particular copolymer that may be advantageously incorporated into the compositions of the invention is a copolymer obtained by the polymerization of methyl methacrylate, n-butyl acrylate and styrene.

According to one most particularly preferable embodiment, the copolymer defined above has a methyl methacrylate/n-butyl acrylate/styrene ratio of between 80-90/7-20/3-10.

Advantageously the copolymers according to the invention have a weight-average molecular weight $M_w$ ranging from 2 million to 10 million, preferably from 4 to 8 million.

According to the invention, the copolymer advantageously represents from 0.3% to 20%, preferably 4 to 15% and more preferably 5 to 12% by weight relative to the total weight of the composition.

The copolymers introduced into the compositions of the invention may be produced by emulsion polymerization of the $C_1$-$C_4$ alkyl methacrylate, the $C_1$-$C_8$ alkyl acrylate comonomer and the styrene monomer in the presence of a polymerization initiator, an emulsifier and optionally a chain transfer agent.

The polymerization medium employed is generally water.

As emulsifiers, mention may be made of anionic surfactants, such as a fatty acid salt, an alkyl sulfate salt, an alkyl benzene sulfate salt, an alkyl phosphate salt or a sulfosuccinate diester salt, or nonionic surfactants, such as a polyoxyethylene alkyl ether or a polyoxyethylene fatty acid ester.

As polymerization initiators, mention may be made of: one or more persulfate salts, such as sodium persulfate, potassium persulfate and ammonium persulfate; an organic peroxide, such as tert-butyl hydroperoxide, cumene hydroperoxide, benzoyl peroxide and lauroyl peroxide; and an azo compound.

As chain transfer agents, mentioned may be made of tert-dodecylmercaptan, tert-decylmercaptan, n-dodecylmercaptan, n-decylmercaptan and n-octylmercaptan.

According to the invention, the thermoplastic matrix may be a matrix based on polyvinyl chloride, ABS (corresponding to an acrylonitrile-butadiene-styrene copolymer), ASA (corresponding to an acrylate-styrene-acrylonitrile copolymer), polycarbonate-polyester, polycarbonate-ABS, polycarbonate-ASA or a blend of two or more of these polymers. Preferably, the matrix is based on polyvinyl chloride.

In particular when the matrix is based on polyvinyl chloride, the composition may also contain: heat stabilizers, such as organotin compounds, lead salts and salts of mixed metals based on calcium and zinc; lubricants; mineral fillers, such as calcium carbonate; pigments; flame retardants; blowing agents; and other additives commonly used and known in the field.

The invention also relates, according to a second subject, to a process for manufacturing an article, comprising:
   a forming step to form a compound of the thermoplastic composition as defined above; and
   a forming step to form said article from said composition.

The latter forming step may be carried out by any process known to those skilled in the art, for example a molding process, such as injection molding, or by extrusion.

According to one most particularly advantageous embodiment, the article may be an expanded article, more preferably an expanded article when the matrix is made of polyvinyl chloride.

In the case of the production of expanded articles, it will be necessary to add at least one blowing agent, such as azodicarbonamide, sodium bicarbonate and other blowing agents known to those skilled in the art.

Finally, the invention relates, according to a third subject, to an article formed from said thermoplastic composition as defined above. For example, this article may take the form of a compact or expanded section, a compact or expanded sheet or a compact or expanded tube. Preferably, said articles are made of polyvinyl chloride, and preferably in expanded form.

Thanks to the thermoplastic composition of the invention, said articles have uniform surfaces, especially free of waviness, and possess closed-cell structures of uniform size.

The invention will now be described in relation to the following examples, which are given by way of illustration but imply no limitation.

In these examples, the composition homogeneity between the copolymer chains is determined by the mid-height width of the peak obtained by liquid adsorption chromatography (LAC), this method consisting in classifying, according to the elution volume, the copolymers as a function of their polarity and not their molecular weight.

More precisely, the method consists in dissolving the copolymer to be analyzed in a solvent, for example THF (tetrahydrofuran), in injecting the resulting solution into the start of the column, and then in eluting the copolymer chains with a solvent mixture gradient.

This mixture will be pure hexane at the start (hexane being a nonsolvent for the copolymer), then becoming richer in THF, before becoming pure THF. This technique is described for example in *Macromolecules,* 34(8), (2001), pages 2667-2672.

EXAMPLE 1

Charged into a reactor, with stirring, were 8500 g of water, 5.23 g of $Na_2CO_3$ and 78.20 g of sodium lauryl sulfate, and the mixture was stirred until complete dissolution.

Three vacuum-nitrogen purges were carried out in succession and the reactor left under a slight vacuum. The reactor was then heated.

At the same time, a mixture comprising 3959 g of methyl methacrylate, 625 g of styrene and 625 g of n-butyl acrylate was nitrogen-degassed for 30 minutes.

Next, the mixture was rapidly introduced into the reactor using a pump. When the temperature of the reaction mixture reached 55° C., 7.8 g of potassium persulfate dissolved in 148 g of water were introduced. The line was rinsed with 50 g of water.

The reaction mixture was left to rise in temperature to the exotherm peak. The polymerization was then left to completion for 60 minutes after the exotherm peak. The reactor was cooled down to 30° C. The polymer was then recovered, the latex being dried by spray drying.

COMPARATIVE EXAMPLE 1

Charged into a reactor, with stirring, were 8600 g of water, 5.23 g of $Na_2CO_3$ and 78.20 g of sodium lauryl sulfate, and the mixture was stirred until complete dissolution.

Three vacuum-nitrogen purges were carried out in succession and the reactor left under a slight vacuum. The reactor was then heated.

At the same time, a mixture comprising 4167 g of methyl methacrylate and 1042 g of n-butyl acrylate was nitrogen-degassed for 30 minutes.

Next, the mixture was rapidly introduced into the reactor using a pump. When the temperature of the reaction mixture reached 55° C., 7.81 g of potassium persulfate dissolved in 98.08 g of water were introduced. The line was rinsed with 50 g of water.

The reaction mixture was left to rise in temperature to the exotherm peak. The polymerization was then left to completion for 60 minutes after the exotherm peak.

The reactor was cooled down to 30° C. and the latex removed.

EXAMPLE 2

Charged into a reactor, with stirring, were 8500 g of water, 5.23 g of $Na_2CO_3$ and 78.20 g of sodium lauryl sulfate, and the mixture was stirred until complete dissolution.

Three vacuum-nitrogen purges were carried out in succession and the reactor left under a slight vacuum. The reactor was then heated.

At the same time, a mixture comprising 4206 g of methyl methacrylate, 260.4 g of styrene and 742 g of n-butyl acrylate was nitrogen-degassed for 30 minutes.

Next, the mixture was rapidly introduced into the reactor using a pump. When the temperature of the reaction mixture reached 55° C., 7.81 g of potassium persulfate dissolved in 148.39 g of water were introduced. The line was rinsed with 50 g of water.

The reaction mixture was left to rise in temperature to the exotherm peak. The polymerization was then left to completion for 60 minutes. The reactor was cooled down to 30° C. and the latex removed.

COMPARATIVE EXAMPLE 2

Charged into a reactor, with stirring, were 8600 g of water, 5.23 g of $Na_2CO_3$ and 38.20 g of sodium lauryl sulfate, and the mixture was stirred until complete dissolution.

Three vacuum-nitrogen purges were carried out in succession and the reactor left under a slight vacuum. The reactor was then heated.

At the same time, a mixture comprising 4427 g of methyl methacrylate and 781 g of n-butyl acrylate was nitrogen-degassed for 30 minutes.

Next, the mixture was rapidly introduced into the reactor using a pump. When the temperature of the reaction mixture reached 55° C., 7.81 g of potassium persulfate dissolved in 98.08 g of water were introduced. The line was rinsed with 50 g of water.

The reaction mixture was left to rise in temperature to the exotherm peak. The polymerization was then left to completion for 60 minutes after the exotherm peak. The reactor was cooled down to 30° C. and the latex removed.

EXAMPLE 3

Charged into a reactor, with stirring, were 8500 g of water, 5.23 g of $Na_2CO_3$ and 78.20 g of sodium lauryl sulfate, and the mixture was stirred until complete dissolution.

Three vacuum-nitrogen purges were carried out in succession and the reactor left under a slight vacuum. The reactor was then heated.

At the same time, a mixture comprising 4427.9 g of methyl methacrylate, 260.5 g of styrene, 520.9 g of n-butyl acrylate and 0.18 g of n-octylmercaptan was nitrogen-degassed for 30 minutes.

Next, the mixture was rapidly introduced into the reactor using a pump. When the temperature of the reaction mixture reached 55° C., 7.81 g of potassium persulfate dissolved in 148.39 g of water were introduced. The line was rinsed with 50 g of water.

The reaction mixture was left to rise in temperature to the exotherm peak. The polymerization was then left to completion for 60 minutes after the exotherm peak. The reactor was cooled down to 30° C. and the latex removed.

COMPARATIVE EXAMPLE 3

Charged into a reactor, with stirring, were 8600 g of water, 5.23 g of $Na_2CO_3$ and 78.20 g of sodium lauryl sulfate, and the mixture was stirred until complete dissolution.

Three vacuum-nitrogen purges were carried out in succession and the reactor left under a slight vacuum. The reactor was then heated.

At the same time, a mixture comprising 4688 g of methyl methacrylate, 521 g of n-butyl acrylate and 0.18 g of n-octylmercaptan was nitrogen-degassed for 30 minutes.

Next, the mixture was rapidly introduced into the reactor using a pump. When the temperature of the reaction mixture reached 55° C., 7.81 g of potassium persulfate dissolved in 98.08 g of water were introduced. The line was rinsed with 50 g of water.

The reaction mixture was left to rise in temperature to the exotherm peak. The polymerization was then left to completion for 60 minutes after the exotherm peak. The reactor was cooled down to 30° C. and the latex removed.

Table 1 below illustrates the compositions and characteristics of Examples 1 to 3 and Comparative Examples 1 to 3 described above.

TABLE 1

| Example | MMA[1] (in g) | Styrene (in g) | BA[2] (in g) | Mid-height width of the LAC peak |
|---|---|---|---|---|
| 1 | 3959 | 625 | 625 | 0.9 |
| Comparative 1 | 4167 | 0 | 1042 | 5.13 |
| 2 | 4206 | 260.4 | 742 | 1.1 |
| Comparative 2 | 4427 | 0 | 781 | 4.4 |
| 3 | 4427.9 | 260.5 | 520.9 | 1.1 |
| Comparative 3 | 4688 | 0 | 521 | 2.2 |

[1]MMA = methyl methacrylate;
[2]BA = n-butyl acrylate.

The reduction in the mid-height width of the peak for the copolymers of Examples 1, 2 and 3 relative to those of the comparative examples therefore indicates an improvement in the copolymer chain composition homogeneity.

EXAMPLE 4

This example illustrates the processing of the copolymers prepared in Example 3 and Comparative Example 3, in a polyvinyl chloride (PVC) resin.

The copolymers were introduced into a formulation comprising a Kwert 57 PVC resin with about 5 phr of a Naftosafe® 30175 one-pack system (containing heat stabilizers based on costabilized calcium and zinc salts and lubricants, available from the company Chemson), about 5 phr of calcium carbonate (1 phr corresponding to 1 part of additive per 100 parts of PCV resin), about 2 phr of titanium oxide and about 0.5 phr of a blowing agent, such as azodicarbonamide.

The copolymers were introduced in an amount of 10 phr.

The blend was homogenized in a Papenmeyer high-speed mixer.

The dry blend was extruded using a laboratory Haake-Polylab extruder fitted with a single screw and a 4 mm diameter rod die.

The screw rotation was 32 rpm. The temperature settings were 140° C., 170° C. and 185° C. going from the rear of the extruder barrel to the die. The temperature setting for the die was 160° C.

The two formulations were extruded at an equivalent rate of 2.1 kg/h. Under these conditions, the specimen according to Example 3 resulted in an expanded extrudate of uniform surface and 0.52 density. this attests to the homogeneity of the copolymer chains, thanks to the addition of styrene within a specific range.

The specimen according to Comparative Example 3 resulted in a very irregular expanded rod, forming numerous surface ripples and having a density of 0.56, attesting to the inhomogeneity of the copolymer chains.

EXAMPLE 5

This example illustrates the processing of the copolymers prepared in Example 2 and Comparative Example 2, in a polyvinyl chloride (PVC) resin.

The copolymers were introduced into a formulation comprising a Kwert 57 PVC resin with about 5 phr of a Naftosafe® 30175 one-pack system (containing heat stabilizers based on costabilized calcium and zinc salts and lubricants, available from the company Chemson), about 5 phr of calcium carbonate (1 phr corresponding to 1 part of additive per 100 parts of PCV resin), about 2 phr of titanium oxide and about 0.5 phr of a blowing agent, such as azodicarbonamide.

The copolymers were introduced in an amount of 7.5 phr.

The blend was homogenized in a Papenmeyer high-speed mixer.

The dry blend was extruded using a laboratory Haake-Polylab extruder fitted with a single screw and a 4 mm diameter rod die.

The screw rotation was 34 rpm. The temperature settings were 170° C., 200° C. and 205° C. going from the rear of the extruder barrel to the die. The temperature setting for the die was 190° C. The two formulations were extruded at an equivalent rate of around 2 kg/h.

Under these conditions, the specimen according to Example 2 resulted in an expanded extrudate of uniform surface and 0.58 density. This attests to the homogeneity of the copolymer chains, thanks to the addition of styrene within a specific range.

The specimen according to Comparative Example 2 resulted in an expanded extrudate of 0.58 density and had a surface with numerous asperities (sharkskin appearance), thereby attesting to the inhomogeneity of the copolymer chains.

The invention claimed is:

1. A thermoplastic composition consisting of:
   at least one thermoplastic matrix selected from the group consisting of polyvinyl chloride, ABS, ASA terpolymer, polycarbonate-polyester, polycarbonate-ABS, polycarbonate-ASA, and a blend of two or more of these; and
   at least one copolymer obtained by copolymerizing a $C_1$-$C_4$ alkyl methacrylate with a $C_1$-$C_8$ alkyl acrylate comonomer and a styrene monomer,
the $C_1$-$C_4$ alkyl methacrylate being present in an amount ranging from 75% to 92% by weight relative to the total weight of the monomers of said copolymer, the $C_1$-$C_8$ alkyl acrylate comonomer being present in an amount ranging from 5 to 20% by weight relative to the total weight of the monomers of said copolymer and the styrene monomer being present in an amount ranging from 3 to 12% by weight relative to the total weight of the monomers of said copolymer, wherein the total copolymer represents from 5% to 12% by weight relative to the total weight of the thermoplastic composition, and wherein each said copolymer has a weight average molecular weight $M_w$ from 2 million to 10 million;
and optionally one or more additives selected from the group consisting of heat stabilizers, lubricants, mineral fillers, pigments, flame retardants, and blowing agents.

2. The thermoplastic composition as claimed in claim 1 in which the thermoplastic matrix is polyvinyl chloride.

3. The thermoplastic composition as claimed in claim 1, which is in expanded form.

4. The thermoplastic composition as claimed in claim 1, in which the $C_1$-$C_4$ alkyl methacrylate monomer is methyl methacrylate.

5. The thermoplastic composition as claimed in claim 1, in which the $C_1$-$C_8$ alkyl acrylate comonomer is chosen from ethyl acrylate, n-butyl acrylate and 2-ethylhexyl acrylate.

6. The thermoplastic composition as claimed in claim 1, in which the $C_1$-$C_8$ alkyl acrylate comonomer is n-butyl acrylate.

7. The thermoplastic composition as claimed in claim 1, in which the $C_1$-$C_8$ alkyl acrylate comonomer is present in an amount ranging from 10% to 20% by weight relative to the total weight of the monomers.

8. The thermoplastic composition as claimed in claim 1, in which the styrene monomer is chosen from styrene, ethylstyrene and α-methylstyrene.

9. The thermoplastic composition as claimed in claim 1, in which the copolymer is a copolymer obtained by the polymerization of methyl methacrylate, n-butyl acrylate and styrene.

10. The thermoplastic composition as claimed in claim 9, in which the methyl methacrylate/n-butyl acrylate/styrene ratio is between 80-90/7-20/3-10.

11. The thermoplastic composition as claimed in claim 1, wherein the thermoplastic composition additionally contains at least one additive selected from the group consisting of heat stabilizers, lubricants, mineral fillers, pigments, flame retardants, and blowing agents.

12. An article formed from said thermoplastic composition as defined in claim 1.

13. The article as claimed in claim 12 which is a compact or expanded section, a compact or expanded sheet, or a compact or expanded tube.

14. The article as claimed in claim 12, which is in expanded form.

15. The article as claimed in claim 12, where in the article comprises closed-cell structures.

* * * * *